United States Patent [19]
Metzler

[11] Patent Number: 5,878,525
[45] Date of Patent: Mar. 9, 1999

[54] SLIP SINKER

[76] Inventor: Norman P. Metzler, 225 W. 10th, Port Angeles, Wash. 98362

[21] Appl. No.: 948,376

[22] Filed: Oct. 9, 1997

[51] Int. Cl.[6] .................................................. A01K 95/00
[52] U.S. Cl. ............................................ 43/43.1; 43/44.94
[58] Field of Search ................................... 43/44.9, 44.87, 43/44.91, 43.1, 44.89, 44.92, 44.93, 44.95, 44.94

[56] References Cited

U.S. PATENT DOCUMENTS

| | | |
|---|---|---|
| 1,999,702 | 4/1935 | Lafond . |
| 2,111,958 | 3/1938 | Bardon ........................................ 43/52 |
| 2,170,067 | 8/1939 | Stephen . |
| 2,399,371 | 4/1946 | Mendelson . |
| 2,494,620 | 1/1950 | Johnson . |
| 2,578,874 | 12/1951 | Zaikpski . |
| 2,814,903 | 12/1957 | Banowetz . |
| 3,091,050 | 5/1963 | Metzler . |
| 3,145,499 | 8/1964 | Stoll . |
| 3,195,262 | 7/1965 | Metzler . |
| 3,426,468 | 2/1969 | Hinkson . |
| 3,514,891 | 6/1970 | Krull ....................................... 43/44.87 |
| 3,659,372 | 5/1972 | Cullen . |
| 4,138,795 | 2/1979 | Welle . |
| 4,546,567 | 10/1985 | Bailey . |
| 4,615,135 | 10/1986 | Swinbanks et al. .................... 43/43.13 |
| 5,150,540 | 9/1992 | Bennett . |

*Primary Examiner*—Jack W. Lavinder
*Attorney, Agent, or Firm*—Christensen O'Connor Johnson & Kindness PLLC

[57] ABSTRACT

A slip sinker includes a nylon tube (12) having a pair of flared ends (14) and (16). A weight (20) is secured to the tube with a pair of partially closed wire loops (22) and (24) disposed at either end of the weight. The weight includes a generally flat surface that extends between the wire loops (22) and (24) and is compressed against the length of the tube in order to securely hold the weight to the tube.

3 Claims, 1 Drawing Sheet

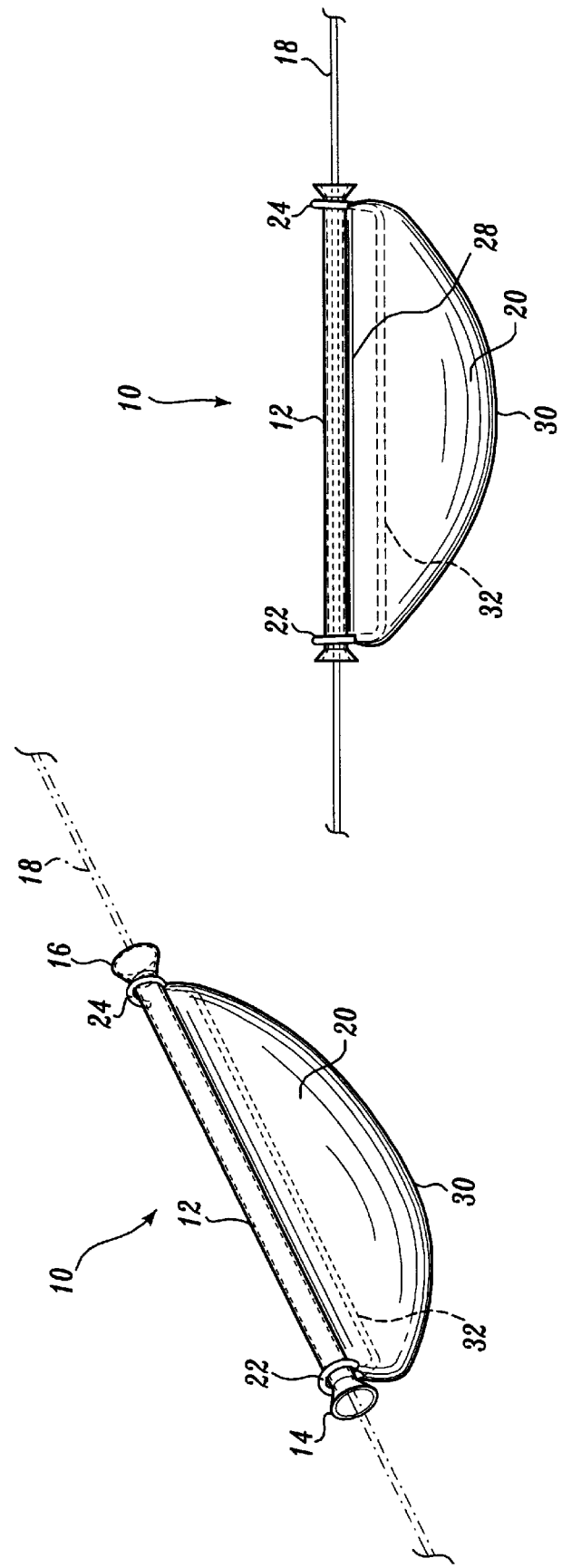

SLIP SINKER

FIELD OF THE INVENTION

The present invention relates to fishing equipment in general and, in particular, to slip sinkers for weighting fishing lines.

BACKGROUND OF THE INVENTION

All fishermen know that it is impossible to catch fish unless the bait is located where the fish are. One method of adjusting the depth of a bait or lure is to place a weight on the fishing line.

With traditional fishing equipment, each time a weight has to be changed, the line must be cut, a new weight added, and the line retied. Because time spent adjusting the amount of weight on the line reduces the time that can actually be spent fishing, numerous quick change weighting systems have been developed. However, such systems are typically prone to snagging and can foul the line when casting.

Given the shortcomings in the prior art, there is a need for a quick change fishing weight system that allows a weight to be easily changed while minimizing the likelihood that the weight will become snagged or will foul a line when cast.

SUMMARY OF THE INVENTION

The present invention is a slip sinker assembly for weighting a fishing line. The slip sinker assembly includes a tube having a first and second flared end through which a fishing line is passed. An elongated weight is secured to the tube at a position near the first and second end. The elongated weight preferably engages and compresses the tube along its length to ensure that the weight is securely held to the tube.

In the presently preferred embodiment of the invention, a pair of wire loops disposed on the ends of elongated weight are used to secure the weight to the tube. The wire loops are preferably wound in opposite directions. The slip sinker assembly is free to slide on the fishing line.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of the slip sinker assembly according to the present invention; and FIG. 2 is a side elevation view of the slip sinker assembly shown in FIG. 1.

DETAILED DESCRIPTION OF THE PREFERRED EMBODIMENT

As indicated above, the present invention is a slip sinker assembly for weighting a fishing line that can be easily changed without cutting the line. The shape of the slip sinker minimizes the likelihood that it will become snagged or will foul a line when cast.

As shown in FIG. 1, the slip sinker assembly 10 according to the present invention includes a nylon or other suitable plastic tube 12 having a first flared end 14 and a second flared end 16. A fishing line 18 is passed through the tube to allow the slip sinker assembly to slide along the fishing line during use.

An elongated weight 20 is secured to the tube to provide weight to the fishing line. The weight 20 is preferably secured to the nylon tube 12 with a pair of wire loops 22 and 24 that are positioned at either end of the weight. The wire loops 22 and 24 are preferably wound in opposite directions. The diameter of the flared ends 14 and 16 is larger than the inner diameter of the wire loops in order to prevent the weight from sliding off the tube 12.

To change the weight, a user slides the tube out of the partially closed loops 22 and 24 while leaving the tube 12 on the fishing line 18. Another either heavier or lighter weight can then be secured to the tube by inserting the tube into the wire loops.

FIG. 2 shows in greater detail the shape of the weight 20. The weight is generally kidney shaped with a substantially flat surface 28 that extends between the first wire loop 22 and the second wire loop 24. The inner diameters of the wire loops are selected so that the flat surface 28 of the weight is compressed against the length of the nylon tube 12 in order to securely hold the weight to the tube. The wire loops 22 and 24 are preferably formed of a continuous piece of wire 32 that is embedded within the body of the weight 20 and which exits the weight at either end.

The weight includes an outer surface 30 that faces away from the tube. The outer surface is generally curved to provide a smooth profile to the weight so that the slip sinker assembly is less likely to become snagged while fishing.

As can be seen from the above description, the present invention is a slip sinker assembly that allows a weight to be easily changed without cutting the fishing line to which it is attached. To change weights, a user needs simply to unclip the weight 20 from the nylon tube 12 and attach a heavier or lighter weight in its place.

While the preferred embodiment of the invention has been illustrated and described, it will be appreciated that various changes can be made therein without departing from the spirit and scope of the invention. For example, if the tube were sufficiently thick, it would be possible to incorporate a channel in the ends of the tube in which the partially closed wire loops 22 and 24 would seat in order to eliminate the flared ends. It is therefore intended that the scope of the invention be determined from the following claims and their equivalents.

The embodiments of the invention in which an exclusive property or privilege is claimed are defined as follows:

1. A slip sinker assembly for weighting a fishing line, comprising:

a tube having a first end and a second end through which the fishing line is passed; and a weight positioned adjacent the tube including a relatively flat surface that engages and is compressed against the tube between the first end and the second end of the tube, the weight includes means for securing the weight to the first end and the second end of the tube, the means for securing the weight to the tube comprises a pair of wire loops integral with the weight and disposed at a first end and a second end of the weight.

2. The slip sinker of claim 1, wherein the pair of loops are wound in opposite directions.

3. The slip sinker of claim 2, wherein the first and second ends of the tube are flared and wherein the diameter of each of the first and second flared ends of the tube is larger than the diameter of the wire loops, preventing the weight from sliding off the tube.

* * * * *